(No Model.)
E. D. BEAN.
POLICEMAN'S BILLY.
No. 248,694.  Patented Oct. 25, 1881.
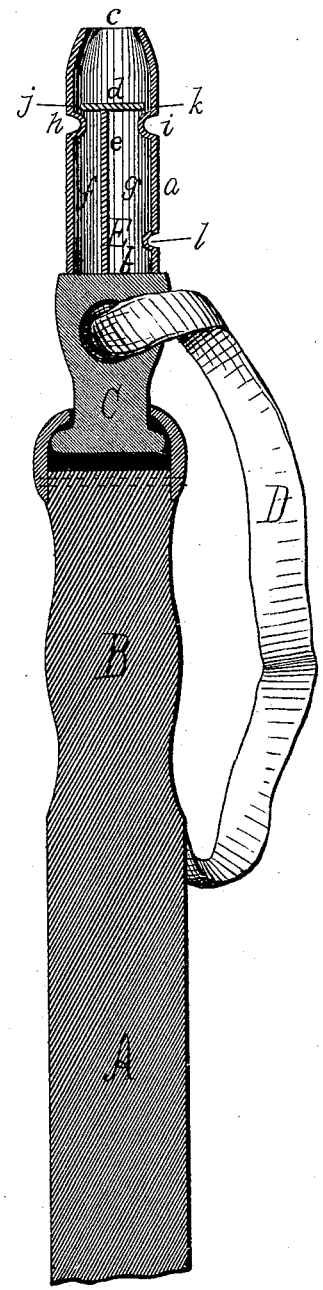
Witnesses.
H. E. Lodge
F. L. Simpson
Inventor.
Edward D. Bean

UNITED STATES PATENT OFFICE.

EDWARD D. BEAN, OF CHELSEA, MASSACHUSETTS.

POLICEMAN'S BILLY.

SPECIFICATION forming part of Letters Patent No. 248,694, dated October 25, 1881.

Application filed April 6, 1881. (No model.)

*To all whom it may concern:*

Be it known that I, EDWARD D. BEAN, a citizen of the United States, residing at Chelsea, in the county of Suffolk and State of Massachusetts, have invented certain new and useful Improvements in a Policeman's Billy; and I do hereby declare the following to be a full, clear, and exact description of the invention, such as will enable others skilled in the art to which it appertains to make and use the same, reference being had to the accompanying drawing, and to letters or figures of reference marked thereon, which forms a part of this specification.

This invention relates especially to policemen's billies or clubs which contain at the end of the handle a rotary swivel to which the wrist-strap is attached for the purpose of preventing the latter from becoming twisted about the owner's wrist; and the invention consists in the combination, with such a swivel and the strap connected therewith, of a whistle permanently attached to the swivel, and by means of which a signal may be given, the two implements being thus combined in one, and the whistle, being a part of the swivel, is prevented from becoming lost or separated from the billy or other article, or misplaced or lost.

The drawing accompanying and making part of this specification represents a sectional view of a policeman's billy containing my invention.

In this drawing, A represents the body, and B the handle, of a policeman's billy, of any suitable make, while C represents a swivel connected with the end of said handle and turning freely in the latter and carrying the wrist-strap D, which prevents the billy from being wrested from the owner's hand, the purpose of the swivel, as before stated, being mainly to prevent the said strap from becoming twisted about the user's wrist.

The whistle before alluded to is shown at E as making part of and constituting the outer end of the swivel, and by being part of or attached permanently to the billy, whip, or other article is prevented from misplacement or loss, which, as the two are necessarily used together, is a matter of great convenience to the owner.

The whistle is constructed as follows: A straight tube, $a$, is employed, closed at one end and open at the other, as shown at $b$ and $c$, and having a transverse shelf, $d$, near its open end, which is secured on its inner side to one end of a longitudinal partition, $e$, which separates the main body of the tube into two chambers, $f$ or $g$, each chamber immediately inside of the shelf being pierced with openings $h$ or $i$. A narrow throat, $j$ or $k$, exists between opposite sides of the shelf $d$ and the inner wall of the tube $a$, immediately outside of the openings $h$ or $i$.

A person's mouth being applied to the open end or mouth-piece $c$, air being blown into the latter escapes through throats $h\ i$ and produces a certain note.

To vary the note of the whistle one chamber—viz., $f$—is of considerably less capacity than the other, and at the bottom of the opposite chamber, $g$, I create an opening, $l$. By closing the opening $l$ and leaving the openings $h\ i$ open one tone is produced. By closing the openings $h$ and $l$ another note is produced. By leaving the three openings $h\ i\ l$ open still another note is produced. By alternately opening and closing the hole $l$ a trill is produced.

My invention, though especially applicable to policemen's billies, is also applicable to dog and riding whips, canes, &c., with good results.

A whistle when carried in the owner's pocket for any length of time becomes clogged with lint and dust, which objectionable result is avoided by attaching such whistle permanently to the billy or cane.

I claim—

1. An attachment for policemen's billies, whips, canes, &c., consisting of a rotary swivel, to which a wrist-strap is attached, and a whistle permanently making part of such swivel.

2. A policeman's billy containing a rotary swivel to which a wrist-strap is connected, and the combination, with such swivel, of a whistle permanently connected therewith.

3. The construction of the whistle, as herein explained, consisting of the tube $a$, closed at one end and open at the other, and containing the shelf $d$, partition $e$, and holes $h$, $i$, and $l$, narrow throats existing between opposite sides of the shelf and the inner wall of the tube, and the whole being as and for purposes stated.

4. A policeman's billy containing a combined strap, swivel, and whistle, substantially as and for purpose set forth.

In testimony whereof I affix my signature in presence of two witnesses.

EDWARD D. BEAN.

Witnesses:
 H. E. LODGE,
 F. G. SIMPSON.